(12) United States Patent
Kihara (10) Patent No.: US 10,303,307 B2
(45) Date of Patent: May 28, 2019

(54) DISPLAY SYSTEM, INFORMATION PROCESSING DEVICE, PROJECTOR, AND INFORMATION PROCESSING METHOD

(71) Applicant: SEIKO EPSON CORPORATION, Tokyo (JP)

(72) Inventor: Hirohiko Kihara, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 16/201,068

(22) Filed: Nov. 27, 2018

(65) Prior Publication Data

US 2019/0095044 A1 Mar. 28, 2019

Related U.S. Application Data

(63) Continuation of application No. 15/465,738, filed on Mar. 22, 2017, now Pat. No. 10,168,836.

(30) Foreign Application Priority Data

Mar. 28, 2016 (JP) ................................. 2016-063107

(51) Int. Cl.
*H04N 9/31* (2006.01)
*G06F 3/042* (2006.01)
(Continued)

(52) U.S. Cl.
CPC ............ *G06F 3/0425* (2013.01); *G06F 3/017* (2013.01); *G06F 3/0304* (2013.01); *G06F 3/038* (2013.01);
(Continued)

(58) Field of Classification Search
CPC .... G06F 3/0425; G06F 3/038; G06F 3/03545; H04N 9/3147; G06T 11/203
See application file for complete search history.

(56) References Cited

U.S. PATENT DOCUMENTS

2013/0127716 A1  5/2013  Nagashima
2013/0215138 A1  8/2013  Suzuki
(Continued)

FOREIGN PATENT DOCUMENTS

JP  2008-116874 A  5/2008
JP  2013-171553 A  9/2013
(Continued)

OTHER PUBLICATIONS

Mar. 2, 2018 Office Action issued in U.S. Appl. No. 15/465,738.

*Primary Examiner* — Andrew Sasinowski
(74) *Attorney, Agent, or Firm* — Oliff PLC (57) ABSTRACT

A display system including an information processing device, a projector (a first projector), and a projector (a second projector) includes a first sensing unit sensing a first event which occurs by an operation of an indicator with respect to an image projected from the first projector; a second sensing unit sensing a second event which occurs by the operation of the indicator with respect to an image projected from the second projector; a replacement unit replacing a set of first event information representing the first event and second event information representing the second event with third event information representing a predetermined third event, in a case where the first event and the second event satisfy predetermined conditions; and a processing unit performing processing corresponding to the third event information.

15 Claims, 6 Drawing Sheets

(51) Int. Cl.
<table>
<tr><td>G06F 3/0354</td><td>(2013.01)</td></tr>
<tr><td>G06F 3/0484</td><td>(2013.01)</td></tr>
<tr><td>G06F 3/041</td><td>(2006.01)</td></tr>
<tr><td>G06F 3/0488</td><td>(2013.01)</td></tr>
<tr><td>G06F 3/03</td><td>(2006.01)</td></tr>
<tr><td>G06F 3/038</td><td>(2013.01)</td></tr>
<tr><td>G06T 11/60</td><td>(2006.01)</td></tr>
<tr><td>G06F 3/01</td><td>(2006.01)</td></tr>
<tr><td>G06T 11/20</td><td>(2006.01)</td></tr>
</table>

(52) U.S. Cl.
CPC .......... *G06F 3/0383* (2013.01); *G06F 3/0386* (2013.01); *G06F 3/03542* (2013.01); *G06F 3/03545* (2013.01); *G06F 3/042* (2013.01); *G06F 3/0416* (2013.01); *G06F 3/04845* (2013.01); *G06F 3/04883* (2013.01); *G06T 11/203* (2013.01); *G06T 11/60* (2013.01); *H04N 9/3147* (2013.01); *H04N 9/3194* (2013.01); *G06T 2200/24* (2013.01)

(56) References Cited

U.S. PATENT DOCUMENTS

| | | |
|---|---|---|
| 2013/0342576 A1 | 12/2013 | Kubota |
| 2014/0071099 A1 | 3/2014 | Kubota et al. |
| 2014/0146080 A1 | 5/2014 | Ivashin et al. |
| 2016/0371859 A1* | 12/2016 | Fujimori .............. H04N 9/3147 |

FOREIGN PATENT DOCUMENTS

| | | |
|---|---|---|
| JP | 2015-191484 A | 11/2015 |
| WO | 2015-146189 A1 | 10/2015 |

\* cited by examiner

DISPLAY SYSTEM, INFORMATION PROCESSING DEVICE, PROJECTOR, AND INFORMATION PROCESSING METHOD

CROSS-REFERENCE TO RELATED APPLICATION(S)

This application is a continuation of U.S. application Ser. No. 15/465,738 filed Mar. 22, 2017, which is based on and claims priority under 35 U.S.C. 119 from Japanese Patent Application No. 2016-063107 filed on Mar. 28, 2016. The contents of the above application are incorporated herein by reference.

BACKGROUND

1. Technical Field

The entire disclosure of Japanese Patent Application No. 2016-63107, filed Mar. 28, 2016 is expressly incorporated by reference herein.

The present invention relates to a display system, an information processing device, a projector, and an information processing method.

2. Related Art

For example, there is a display device disclosed in JP-A-2013-171553 as a technology for performing handwriting input with two display devices including a touch panel. In a case where a stylus pen is separated from the vicinity of a bezel of one display device, and thus, a pen-up event occurs, and then, a stylus pen is close to the vicinity of a bezel of the other display device, and thus, a pen-down event occurs, the display device performs correction processing with respect to a line which is displayed on the other display device when an elapsed time from the pen-up to the pen-down is within a predetermined time.

In the technology of JP-A-2013-171553, in a case where the stylus pen is moved from one display device to the other display device, the pen-up event is detected when the stylus pen is separated from the vicinity of the bezel of one display device, and the pen-down event is detected when the stylus pen is in contact with the display device in the vicinity of the bezel of the other display device. Thus, in a case where the pen-up event is detected when the indicator is moved to the adjacent screen, there is a case where an operation intended by a user may not be performed.

SUMMARY

An advantage of some aspects of the invention is to provide a technology of enabling processing according to the movement of an indicator to be performed in a case where the indicator is moved from one to the other on adjacent images displayed by different devices.

An aspect of the invention provides a display system including an information processing device, a first projector, and a second projector, the display system including: a first sensing unit sensing a first event which occurs by an operation of an indicator with respect to an image projected onto a projection surface from the first projector; a second sensing unit sensing a second event which occurs by the operation of the indicator with respect to an image projected onto the projection surface from the second projector; a replacement unit replacing a set of first event information representing the first event and second event information representing the second event with third event information representing a predetermined third event, in a case in which the first event and the second event satisfy predetermined conditions; and a processing unit performing processing corresponding to the third event information.

According to the aspect of the invention, in a case where the indicator is moved from one to the other on adjacent images displayed by different devices, it is possible to perform processing according to the movement of the indicator.

In the aspect of the invention, the information processing device may include the replacement unit and the processing unit.

According to such a configuration, it is possible to operate the information processing device according to the operation of the indicator.

In the aspect of the invention, the display system may have a configuration in which the first projector includes the replacement unit, and the information processing device includes the processing unit.

According to such a configuration, it is possible to operate the information processing device according to the operation of the indicator.

In the aspect of the invention, the display system may have a configuration in which the first projector includes the replacement unit, and the second projector includes the processing unit.

According to such a configuration, it is possible to perform processing according to the movement of the indicator in the projector.

In the aspect of the invention, the display system may have a configuration in which the replacement unit replaces the set of the first event information and the second event information with the third event information representing that the indicator is moved, in a case in which one of the first event and the second event is an event representing that the indicator is separated from the projection surface, and the other is an event representing that the indicator is in contact with the projection surface.

According to such a configuration, when the indicator is moved from a screen of the first projector to a screen of the second projector, it is possible to perform the processing according to the movement of the indicator without recognizing that the indicator is separated from the screen.

In the aspect of the invention, the display system may have a configuration in which the replacement unit replaces the set of the first event information and the second event information with the third event information representing that the indicator is moved, in a case in which one of the first event and the second event is an event representing that the indicator is separated from the projection surface, the other is an event representing that the indicator is in contact with the projection surface, and a temporal difference between at the time of sensing the event representing that the indicator is separated from the projection surface and at the time of sensing the event representing that the indicator is in contact with the projection surface is shorter than a predetermined time.

According to such a configuration, when the indicator is moved from the screen of the first projector to the screen of the second projector, it is possible to perform the processing according to the movement of the indicator without recognizing that the indicator is separated from the screen.

In the aspect of the invention, the display system may have a configuration in which the first sensing unit senses coordinates of the indicator with respect to the image which is projected from the first projector, the second sensing unit senses coordinates of the indicator with respect to the image which is projected from the second projector, and the replacement unit replaces the set of the first event information and the second event information with the third event information, in a case in which one of the first event and the second event is an up event representing that the indicator is separated from the projection surface, the other is a down event representing that the indicator is in contact with the projection surface, and a distance from coordinates of the indicator sensed before the up event to coordinates of the indicator sensed at the time of sensing the down event is less than a predetermined threshold value.

According to such a configuration, when the indicator is moved from the screen of the first projector to the screen of the second projector, it is possible to perform the processing according to the movement of the indicator without recognizing that the indicator is separated from the screen.

In the aspect of the invention, the display system may have a configuration in which the replacement unit replaces the set of the first event information and the second event information with the third event information, in a case in which one of the first event and the second event is an up event representing that the indicator is separated from the projection surface, the other is a down event representing that the indicator is in contact with the projection surface, and coordinates of the indicator sensed before the up event and coordinates of the indicator at the time of sensing the down event are within a predetermined range from a boundary between the image which is projected from the first projector and the image which is projected from the second projector.

According to such a configuration, when the indicator is moved from the screen of the first projector to the screen of the second projector, it is possible to perform the processing according to the movement of the indicator without recognizing that the indicator is separated from the screen.

In the aspect of the invention, the display system may have a configuration in which the processing which is performed by the processing unit is processing of performing drawing within the image which is projected from the first projector or the image which is projected from the second projector.

According to such a configuration, it is possible to perform drawing according to the movement of the indicator from the screen of the first projector to the screen of the second projector.

In the aspect of the invention, the display system may have a configuration in which the first projector supplies information representing a position of the image which is projected onto the projection surface from the first projector to the information processing device, and the second projector supplies information representing a position of the image which is projected onto the projection surface from the second projector to the information processing device.

According to such a configuration, it is possible for the information processing device to recognize the projector which senses the event of the indicator.

Another aspect of the invention provides an information processing device supplying an image to a first projector and a second projector, the information processing device including: a first acquisition unit acquiring a first event which occurs by an operation of an indicator with respect to an image projected onto a projection surface from the first projector; a second acquisition unit acquiring a second event which occurs by the operation of the indicator with respect to an image projected onto the projection surface from the second projector; a replacement unit replacing a set of first event information representing the first event and second event information representing the second event with third event information representing a predetermined third event, in a case in which the first event and the second event satisfy predetermined conditions; and a processing unit performing processing corresponding to the third event.

According to the aspect of the invention, in a case where the indicator is moved from one to the other on adjacent images displayed by different devices, it is possible to perform processing according to the movement of the indicator.

Still another aspect of the invention provides a projector including: a sensing unit sensing a first event which occurs by an operation of an indicator with respect to an image projected onto a projection surface from an own device; an acquisition unit acquiring a second event which occurs by the operation of the indicator with respect to an image projected onto the projection surface from a projector, from the projector connected to the own device; and a replacement unit replacing a set of first event information representing the first event and second event information representing the second event with third event information representing a predetermined third event, in a case in which the first event and the second event satisfy predetermined conditions.

According to the aspect of the invention, in a case where the indicator is moved from one to the other on adjacent images displayed by different devices, it is possible to perform processing according to the movement of the indicator.

Yet another aspect of the invention provides an information processing method including: first sensing a first event which occurs by an operation of an indicator with respect to an image projected onto a projection surface from a first projector; second sensing a second event which occurs by the operation of the indicator with respect to an image projected onto the projection surface from a second projector; replacing a set of first event information representing the first event and second event information representing the second event with third event information representing a predetermined third event, in a case in which the first event and the second event satisfy predetermined conditions; and performing processing corresponding to the third event information.

According to the aspect of the invention, in a case where the indicator is moved from one to the other on adjacent images displayed by different devices, it is possible to perform processing according to the movement of the indicator.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
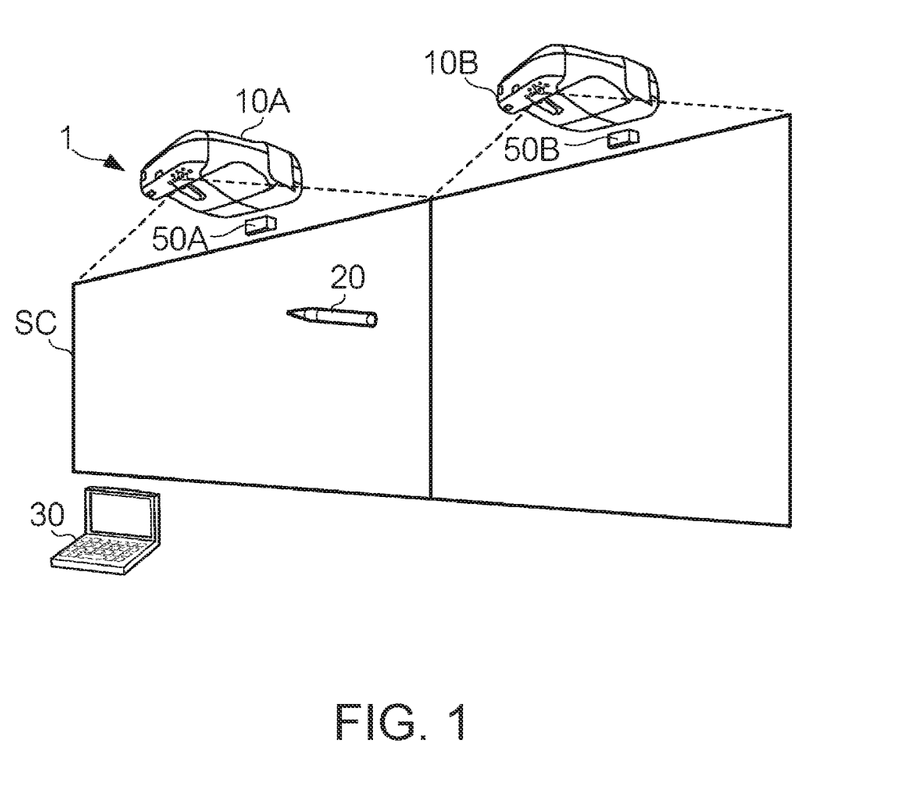
FIG. 1 is a diagram illustrating a device according to a display system.

FIG. 1 is a diagram illustrating a device according to a display system 1 which is an embodiment of the invention. The display system 1 includes an information processing device 30, and a projector 10A (a first projector) and a projector 10B (a second projector) projecting an image onto a screen SC which becomes a display surface.

In this embodiment, the information processing device 30 is a personal computer. The information processing device 30 has a multi display function of extending a desktop by using a plurality of display devices.

A pen-type indicator 20 functions as a pointing device for operating the projectors 10A and 10B or the information processing device 30.

Light emitting devices 50A and 50B include a light emitting unit irradiating a finger on the screen SC with light (in this embodiment, infrared light). The light emitting devices 50A and 50B are disposed on an upper end of the screen SC, and diffuse infrared light to a downward direction in a range of an angle of θ in order to allow the infrared light to exit. The light exiting from the light emitting devices 50A and 50B forms a light layer along the screen SC. In this embodiment, the angle of θ reaches approximately 180 degrees, and the light layer is formed on approximately the entire screen SC. It is preferable that the surface of the screen SC is close to the light layer which is formed by the light emitting devices 50A and 50B. The light layer has a thickness such that a finger in a position which is separated from the surface of the screen SC can also be irradiated with light. In addition, the finger in the separated position may be irradiated with light by laminating the light emitting unit. The exiting of the light from the light emitting device 50A is controlled by the projector 10A, and the exiting of the light from the light emitting device 50B is controlled by the projector 10B.

The projectors 10A and 10B which are an example of a display device, project an image represented by a video signal which is supplied from the information processing device 30 onto the screen SC which is an example of a projection surface. In this embodiment, the projectors 10A and 10B become the display device when the information processing device 30 uses the multi display function. In addition, the projectors 10A and 10B have a PC operation function for using the indicator 20 as a pointing device of the information processing device 30. The projectors 10A and 10B are disposed obliquely upward on the screen SC, and project a video onto the screen SC. Furthermore, in this embodiment, the projectors 10A and 10B project the video onto the screen SC, and may project the video onto a wall surface (the display surface) instead of the screen SC. In addition, in this embodiment, the projectors 10A and 10B have a configuration in which the projectors 10A and 10B are disposed on the wall surface by a clasp, but may be disposed on the ceiling. In a case where the projectors 10A and 10B are disposed on the ceiling, the projectors 10A and 10B may project the video onto a desk instead of the screen SC.

Configurations of Projectors 10A And 10B, and Indicator 20

Figure 2:
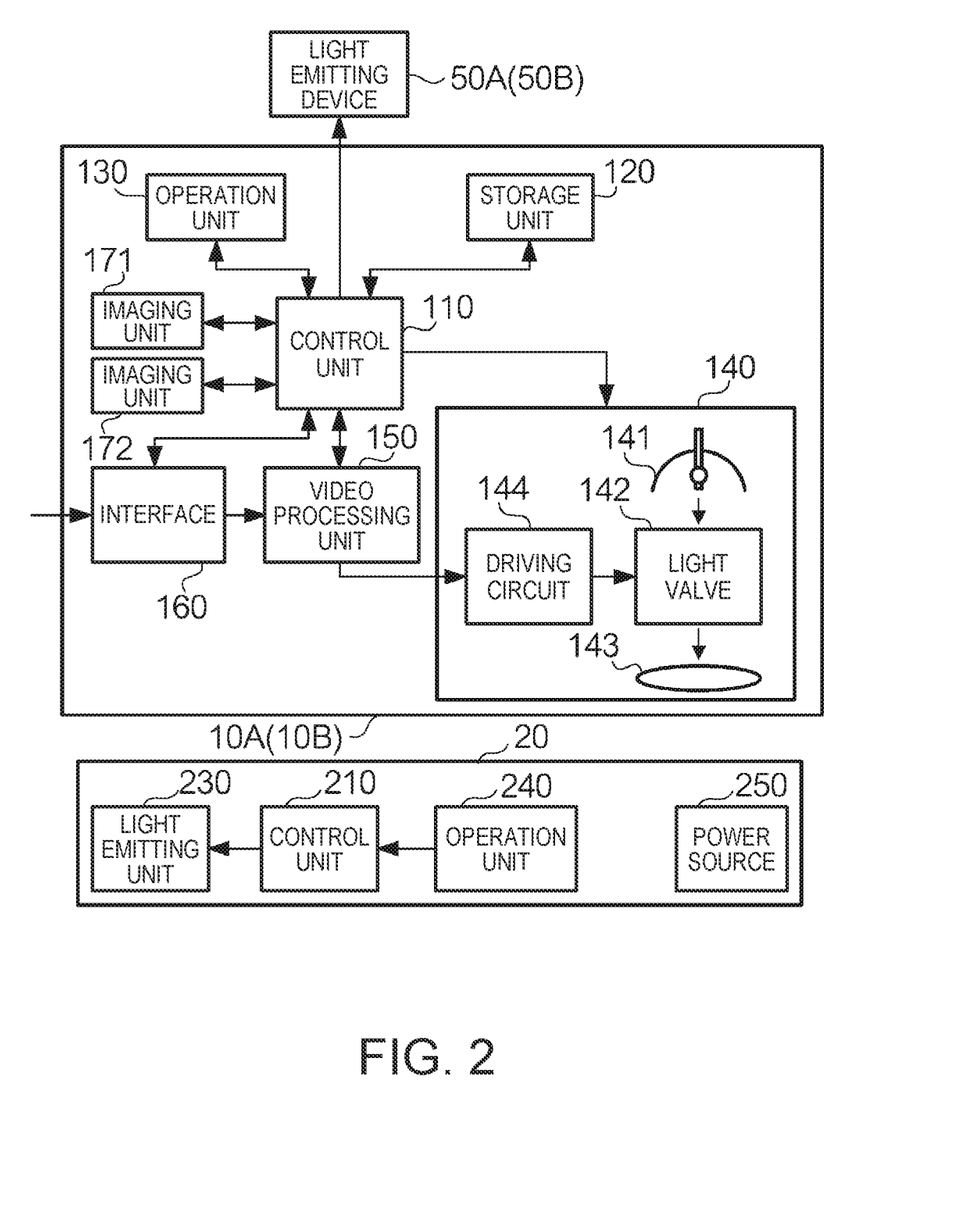
FIG. 2 is a diagram illustrating hardware configurations of projectors and an indicator.

FIG. 2 is a diagram illustrating hardware configurations of the projectors 10A and 10B, and the indicator 20. The indicator 20 includes a control unit 210, a light emitting unit 230, an operation unit 240, and a power source 250. The power source 250, for example, is a dry cell or a secondary cell, and supplies electric power to the control unit 210, the light emitting unit 230, and the operation unit 240. The operation unit 240 includes a switch (not illustrated) controlling the supply of the electric power from the power source 250 to each unit. In a case where the switch of the operation unit 240 is turned on, the electric power is supplied from the power source 250 to each of the units, and in a case where the switch of the operation unit 240 is turned off, the supply of the electric power from the power source 250 to each of the units is stopped. The light emitting unit 230 includes a light emitting diode emitting infrared light, and is disposed on the tip of the indicator 20. The lighting-on and the lighting-off of the light emitting unit 230 are controlled by the control unit 210. The light emitting unit 230 is a point light source, and the light emitted from the light emitting unit 230 spreads onto a spherical surface from the tip of the indicator 20. The control unit 210 is connected to the light emitting unit 230 and the operation unit 240. The control unit 210 starts the control of the light emitting unit 230 according to the operation which is performed by the operation unit 240, and controls the lighting-on and the lighting-off of the light emitting diode of the light emitting unit 230.

The projectors 10A and 10B include a control unit 110, a storage unit 120, an operation unit 130, and a projection unit 140. In addition, the projectors 10A and 10B include a video processing unit 150, an interface 160, and an imaging unit 171 and an imaging unit 172. In this embodiment, the hardware configurations of the projectors 10A and 10B are identical to each other, and thus, in the following description, in a case where it is necessary to distinguish each unit of the projector 10A from each unit of the projector 10B, for the sake of simplicity of the description, "A" is added to the end of the reference numeral of each of the units of the projector 10A, and "B" is added to the end of the reference numeral of each of the units of the projector 10B, and in a case where it is not necessary to distinguish the units from each other, the description will be performed without adding "A" or "B" to the end of the reference numeral.

The interface 160 includes a plurality of connectors to which a video signal is supplied, such as RCA, D-Sub, and HDMI (Registered Trademark), and supplies the video signal which is supplied to the connector from the other device to the video processing unit 150. In addition, the interface 160 includes an interface of wireless communication such as a wireless local area network (LAN) or Bluetooth (Registered Trademark), and an interface of wire communication such as a universal serial bus (USB) or a wired LAN, and performs communication with the information processing device 30 by the interface.

The storage unit 120 stores a setting value relevant to image quality of a video to be projected, or information relevant to the setting of various functions. The operation unit 130 includes a plurality of buttons for operating the projector 10. The control unit 110 controls each unit according to the operated button, and thus, the adjustment of the video to be projected onto the screen SC, the setting of the various functions of the projector 10, and the like are performed.

The video processing unit 150 acquires the video signal which is supplied from the interface 160. In addition, the video processing unit 150 acquires a signal of an on-screen image for operating the projector 10, such as GUI, from the control unit 110. The video processing unit 150 has various image processing functions, performs image processing with respect to the video signal which is supplied from the interface 160, and adjust the image quality of the video to be projected. In a case where the signal of the on-screen image is supplied from the control unit 110, the video processing unit 150 supplies the video signal superimposed on the signal of the on-screen image to the projection unit 140.

The projection unit 140 projecting the video includes a light source 141, a light valve 142, a driving circuit 144, and a projection optical system 143. The light source 141 is a lamp emitting light, and the light emitted from the light source 141 is dispersed into red light, green light, and blue light by a plurality of dichroic mirrors or a mirror (not illustrated), and each of the dispersed red light, green light, and blue light is guided to the light valve 142. Furthermore, the light source 141 may not be a lamp, but may be a light emitting diode or a semiconductor laser device emitting laser light.

The driving circuit 144 acquires the video signal which is supplied from the video processing unit 150. The video signal to be supplied to the driving circuit 144 includes gradation data representing a gradation of a red component on an image to be projected, gradation data representing a gradation of a green component on the image to be projected, and gradation data representing a gradation of a blue component on the image to be projected. The driving circuit 144 extracts the gradation data of each color of red, green, and blue, and drives the light valve 142 on the basis of the extracted gradation data of each of the colors.

The light valve 142 includes a liquid crystal light valve on which the red light described above is incident, and a liquid crystal light valve on which the green light described above is incident, and a liquid crystal light valve on which the blue light described above is incident. The liquid crystal light valve is a transmissive liquid crystal panel, and includes pixels which are arranged into the shape of a matrix of a plurality of rows and a plurality of columns. The liquid crystal light valve on which the red light is incident is driven on the basis of the gradation data of red, the liquid crystal light valve on which the green light is incident is driven on the basis of the gradation data of green, and the liquid crystal light valve on which the blue light is incident is driven on the basis of the gradation data of blue. In each of the liquid crystal light valve, each of the pixels is controlled by the driving circuit 144, and thus, the transmittance of the pixel is changed. The transmittance of the pixel is controlled, and thus, light of each of the colors which is transmitted through the liquid crystal light valve becomes an image corresponding to each of the gradation data items. The images of the red light, the green light, and the blue light which are transmitted through the liquid crystal light valves are synthesized by a dichroic prism (not illustrated), and are incident on the projection optical system 143. The projection optical system 143 is an optical system enlarging the incident image, and enlarges the incident image by a lens or a mirror and projects the enlarged image onto the screen SC. In a case where the image is projected onto the screen SC, the image is displayed on the screen SC which is the display surface. Furthermore, a reflective liquid crystal panel may be adopted instead of the transmissive liquid crystal panel, and a digital mirror device or the like may be used.

In order to specify the position of the indicator 20 and a distance from the indicator 20 to the screen SC by a stereo system, the projectors 10A and 10B include two imaging units of an imaging unit 171 and an imaging unit 172. The imaging unit 171 and the imaging unit 172 include an imaging element (CMOS, CCD, or the like) receiving infrared light which is emitted from the light emitting unit 230 or infrared light which exits from the light emitting device 50 and is reflected on the finger, an optical system forming an image on the imaging element, a diaphragm limiting the light which is incident on the imaging element, and the like. The imaging unit 171 and the imaging unit 172 set a projection range of the projection unit 140 to an imaging range, generate an image in the imaging range, and supply the generated image to the control unit 110. Furthermore, in this embodiment, the projectors 10A and 10B are disposed obliquely upward on the screen SC, and thus, the imaging unit 171 and the imaging unit 172 image the projection range from the oblique upper side.

The control unit 110 is a microcomputer including a central processing unit (CPU), a read only memory (ROM), and a random access memory (RAM). In a case where a program stored in the ROM is executed by the CPU, the control unit 110 controls each unit, and thus, a function of projecting a video onto the screen SC, the PC operation function described above, and the like are realized.

Figure 3:
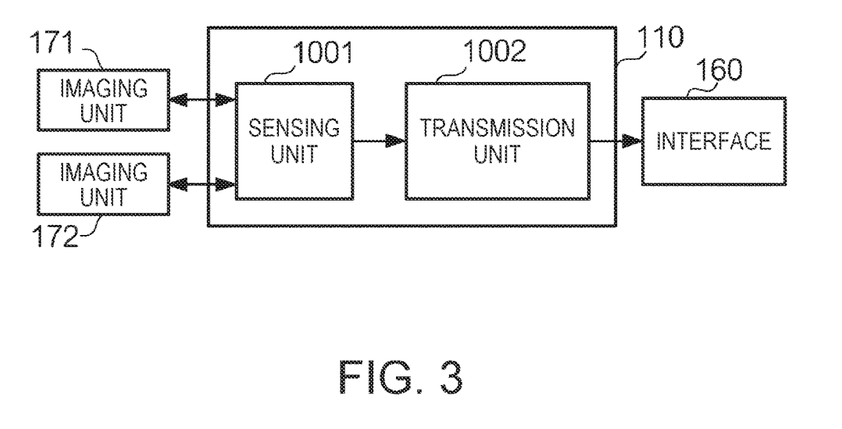
FIG. 3 is a functional block diagram of a function which is realized in a control unit.

FIG. 3 is a functional block diagram of the function which is realized in the control unit 110 by executing the program in the ROM.

A sensing unit 1001 analyzes the images which are supplied from the imaging unit 171 and the imaging unit 172, and senses an event which occurs by the indicator 20 or the finger. In addition, the sensing unit 1001 analyzes the images which are supplied from the imaging unit 171 and the imaging unit 172, and specifies the coordinates of the position of the indicator 20 or the finger in a display region of the image which is projected from the projection unit 140, and a distance from the indicator 20 to the screen SC which is the display surface of the image. Furthermore, the sensing unit 1001A of the projector 10A corresponds to a first sensing unit sensing a first event which occurs by the operation of the indicator with respect to the image projected onto the projection surface from the projector 10A, and a sensing unit 1001B of the projector 10B corresponds to a second sensing unit sensing a second event which occurs by the operation of the indicator with respect to the image projected onto the projection surface from the projector 10B. Alternatively, a transmission unit 1002A of the projector 10A supplies event information (first event information) representing the first event to the information processing device 30, and a transmission unit 1002B of the projector 10B supplies event information (second event information) representing the second event to the information processing device 30.

The transmission unit 1002 transmits event information representing the event which is sensed by the sensing unit 1001 or coordinate information representing the coordinates which are sensed by the sensing unit 1001 to the information processing device 30 from the interface 160 through a USB cable.

Configuration of Information Processing Device 30

Next, the configuration of the information processing device 30 will be described. The information processing device 30 is a computer including a central processing unit (CPU), a read only memory (ROM), and a random access memory (RAM).

The information processing device 30 acquires the information which is supplied from the projectors 10A and 10B, and stores a device driver transmitting the acquired information to an operating system.

Figure 4:
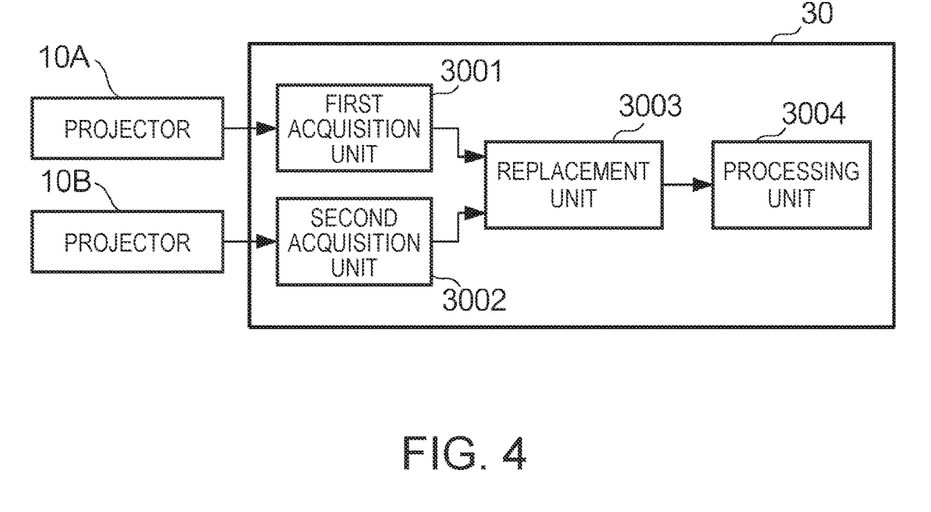
FIG. 4 is a functional block diagram of a function which is realized in an information processing device.

FIG. 4 is a functional block diagram of the function which is realized in the information processing device 30 by executing the device driver. A first acquisition unit 3001 acquires the event information (the first event information) or the coordinate information which is supplied from the projector 10A. A second acquisition unit 3002 acquires the event information (the second event information) or the coordinate information which is supplied from the projector 10B. In a case where the event (the first event) represented by the first event information which is acquired by the first acquisition unit 3001 and the event (the second event) represented by the second event information which is acquired by the second acquisition unit 3002 satisfy predetermined conditions, a replacement unit 3003 replaces a set of the first event information which is acquired by the first acquisition unit 3001 and the second event information which is acquired by the second acquisition unit 3002 with event information (third event information) representing a predetermined event (a third event). A processing unit 3004 performs processing according to the event information after being replaced by the replacement unit 3003. In a case where the CPU of the information processing device 30 executes a program stored in the ROM of the information processing device 30, a function of the replacement unit 3003 and the function of the processing unit 3004 are realized.

Operational Example of Embodiment

Next, an operational example of this embodiment will be described. In this embodiment, the information processing device 30 and the projectors 10A and 10B are connected to each other by a USB cable, and perform communication through the USB cable. In addition, the information processing device 30 and the projectors 10A and 10B are connected to each other by a video cable, and the projectors 10A and 10B acquire the video signal which is supplied from the information processing device 30.

In the information processing device 30, the setting of the multi display function of extending a desktop by laterally arranging two screens side by side is performed, and the information processing device 30 supplies a video signal of a screen on the left side to the projector 10A and supplies a video signal of a screen on the right side to the projector 10B.

Figure 5:
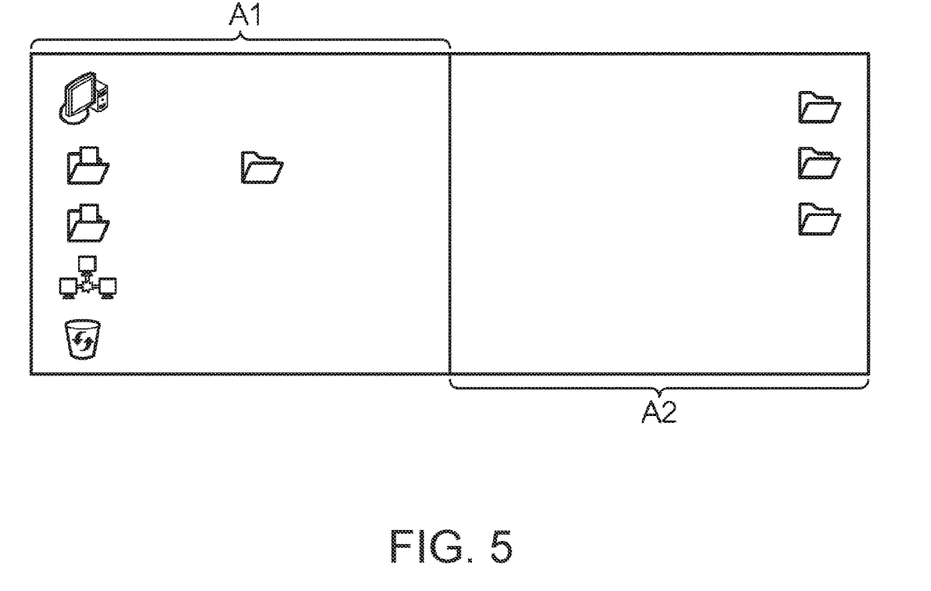
FIG. 5 is a diagram illustrating an example of an image which is projected onto a screen.

FIG. 5 is an example of the images which are projected onto the screen SC from the projectors 10A and 10B. In FIG. 5, the portion of the region A1 is the image which is projected from the projector 10A, and the portion of the region A2 is the image which is projected from the projector 10B. In a case of using a direct viewing display device with the multi display function, the display device includes a frame (a bezel) surrounding the display screen, and thus, there is a gap between the screen on the left side and the screen on the right side, but in this embodiment, it is possible to laterally display the image which is projected from the projector 10A and the image which is projected from the projector 10B side by side (so-called tiling display), and thus, it is possible to display the two screens side by side without having a gap therebetween.

An imaging unit 171A and an imaging unit 172A image the region A1. In the images which are supplied from the imaging unit 171A and the imaging unit 172A, a control unit 110A sets xy coordinates by using the apex of the region A1 on the upper left side as an original point, and by setting the right direction from the original point to a positive direction of the x axis and the lower direction from the original point to a positive direction of the y axis. In addition, an imaging unit 171B and an imaging unit 172B image the region A2. In the images which are supplied from the imaging unit 171B and the imaging unit 172B, a control unit 110B sets xy coordinates by using the apex of the region A2 on the upper left side as an original point, and by setting the right direction from the original point to the positive direction of the x axis and the lower direction from the original point to the positive direction of the y axis.

In a case where the indicator 20 emitting the infrared light enters an imaging range of the imaging unit 171A and the imaging unit 172A, the infrared light emitted from the light emitting unit 230 is displayed on the images generated by the imaging unit 171A and the imaging unit 172A. The control unit 110A analyzes the images which are supplied from the imaging unit 171A and the imaging unit 172A, and specifies the coordinates of the position of the infrared light in the xy coordinates of the region A1 and a distance from the infrared light to the screen SC (that is, a distance from the tip of the indicator 20 to the screen SC).

Figure 6:
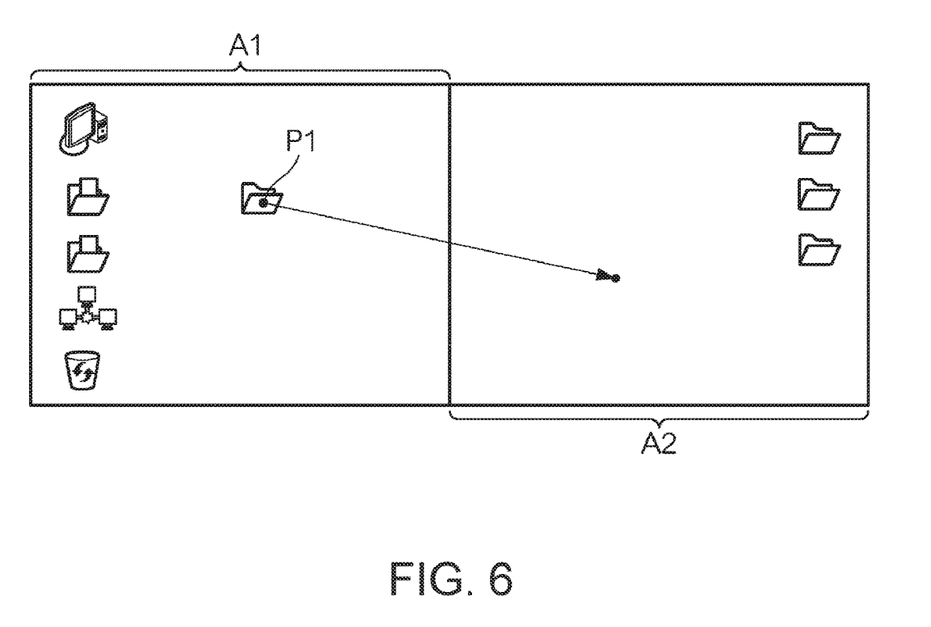
FIG. 6 is a diagram for illustrating an operational example.

For example, in a case where the user brings the light emitting unit 230 of the indicator 20 into contact with a position P1 illustrated in FIG. 6, the control unit 110A analyzes the images which are supplied from the imaging unit 171A and the imaging unit 172A, specifies the distance from the infrared light to the screen SC as 0, and sets the event of the indicator 20 to "pen-down" representing that the indicator 20 is in contact with the projection surface. The pen-down event is an example of a down event according to the invention. In addition, the control unit 110A specifies the coordinates of the position P1 from the images which are supplied from the imaging unit 171A and the imaging unit 172A. The control unit 110A transmits the event information representing "pen-down", and the coordinate information representing the specified coordinates to the information processing device 30 from an interface 160A through a USB cable.

In a case where the information transmitted from the projector 10A is acquired, the information processing device 30 performs processing according to the acquired information. For example, in a case where the event information is "pen-down", and a position on the desktop with respect to the acquired coordinate information is the position P1 on an icon, the information processing device 30 drags the icon in the position P1.

The control unit 110A periodically specifies the distance from the infrared light to the screen SC and the position of the infrared light by using the images which are supplied from the imaging unit 171A and the imaging unit 172A. In a case where the user moves the indicator 20 from the position P1 to the direction of an arrow illustrated in FIG. 6, the control unit 110A analyzes the images which are supplied from the imaging unit 171A and the imaging unit 172A, and specifies the distance from the infrared light to the screen SC as 0. In a case where the newly specified distance is 0, and the previously specified distance is also 0, the control unit 110A set the event of the indicator 20 to "move" representing that the indicator 20 is being moved. In addition, the control unit 110A specifies the coordinates of the position after moving the infrared light from the images which are supplied from the imaging unit 171A and the imaging unit 172A. The control unit 110A transmits the event information representing "move" and the coordinate information representing the specified coordinates to the information processing device 30 from the interface 160A through the USB cable.

In a case where the information transmitted from the projector 10A is acquired, the information processing device 30 performs processing according to the acquired information. In a case where the event information is "move", the information processing device 30 moves the icon in the position P1 according to the coordinates which are represented by the acquired coordinate information.

Figure 7:
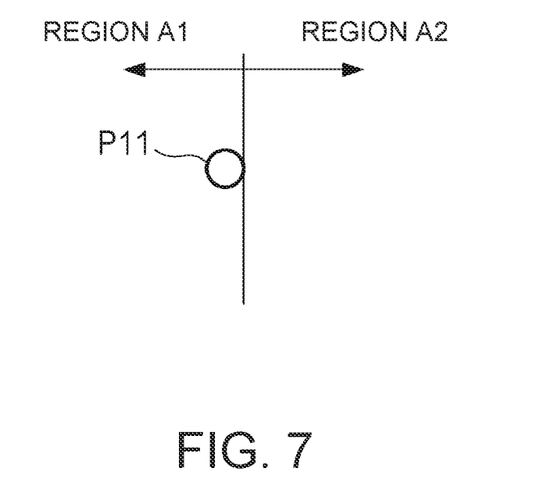
FIG. 7 is a diagram for illustrating an operational example.

Next, in a case where the user moves the indicator 20 in a state of being in contact with the screen SC, and thus, the position of the infrared light which is emitted from the indicator 20 becomes a position P11 on the right end of the region A1 as illustrated in FIG. 7, the control unit 110A transmits the event information representing "move" and the coordinate information representing the coordinates of the position P11 to the information processing device 30 from the interface 160A through the USB cable. In a case where the information transmitted from the projector 10A is acquired, the information processing device 30 moves the icon in a state of being dragged according to the coordinates represented by the acquired coordinate information.

Figure 8:
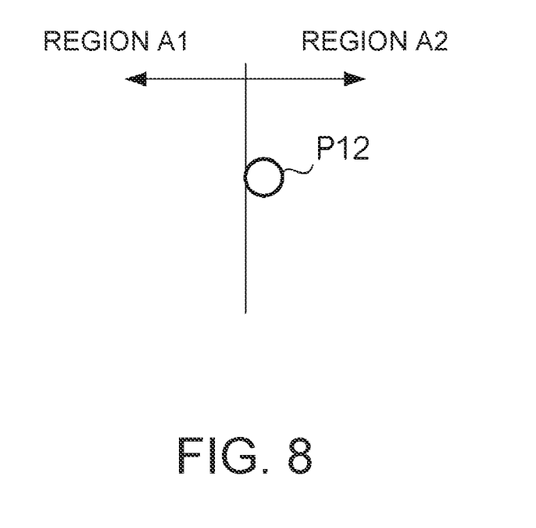
FIG. 8 is a diagram for illustrating an operational example.

Next, in a case where the user moves the indicator 20 in a state of being in contact with the screen SC, and the position of the infrared light is moved to the region A2 from the region A1, and thus, becomes a position P12 on a left end of the region A2 as illustrated in FIG. 8, the infrared light emitted from the indicator 20 is not displayed on the images which are generated by the imaging unit 171A and the imaging unit 172A, but the infrared light emitted from the indicator 20 is displayed on the images which are generated by the imaging unit 171B and the imaging unit 172B.

In a case where the infrared light is not displayed on the images which are generated by the imaging unit 171A and the imaging unit 172A, the control unit 110A sets the event of the indicator 20 to "pen-up" representing that the indicator 20 is separated from the projection surface. The pen-up event is an example of an up event according to the invention.

In contrast, the infrared light emitted from the light emitting unit 230 is displayed on the images which are generated by the imaging unit 171B and the imaging unit 172B. The control unit 110B acquires the images which are supplied from the imaging unit 171B and the imaging unit 172B. The control unit 110B analyzes the images which are supplied from the imaging unit 171B and the imaging unit 172B, and specifies the coordinates of the position of the infrared light in the xy coordinates of the region A2 and the distance from the infrared light to the screen SC which is the display surface of the image. The control unit 110B analyzes the images which are supplied from the imaging unit 171B and the imaging unit 172B, specifies the distance from the infrared light to the screen SC as 0, and sets the event of the indicator 20 to "pen-down" representing that the indicator 20 is in contact with the projection surface. In addition, the control unit 110B specifies the coordinates of the position P12 from the images which are supplied from the imaging unit 171A and the imaging unit 172A.

The control unit 110A transmits the event information representing "pen-up" to the information processing device 30 from the interface 160A through the USB cable. In addition, the control unit 110B transmits the event information representing "pen-down" and the coordinate information representing the coordinates of the position P12 to the information processing device 30 from the interface 160B through the USB cable.

In a case where event information which is supplied from one projector is changed to "pen-up" from "move", and event information which is supplied from the other projector becomes "pen-down", the information processing device 30 performs processing of replacing the event information.

Figure 9:
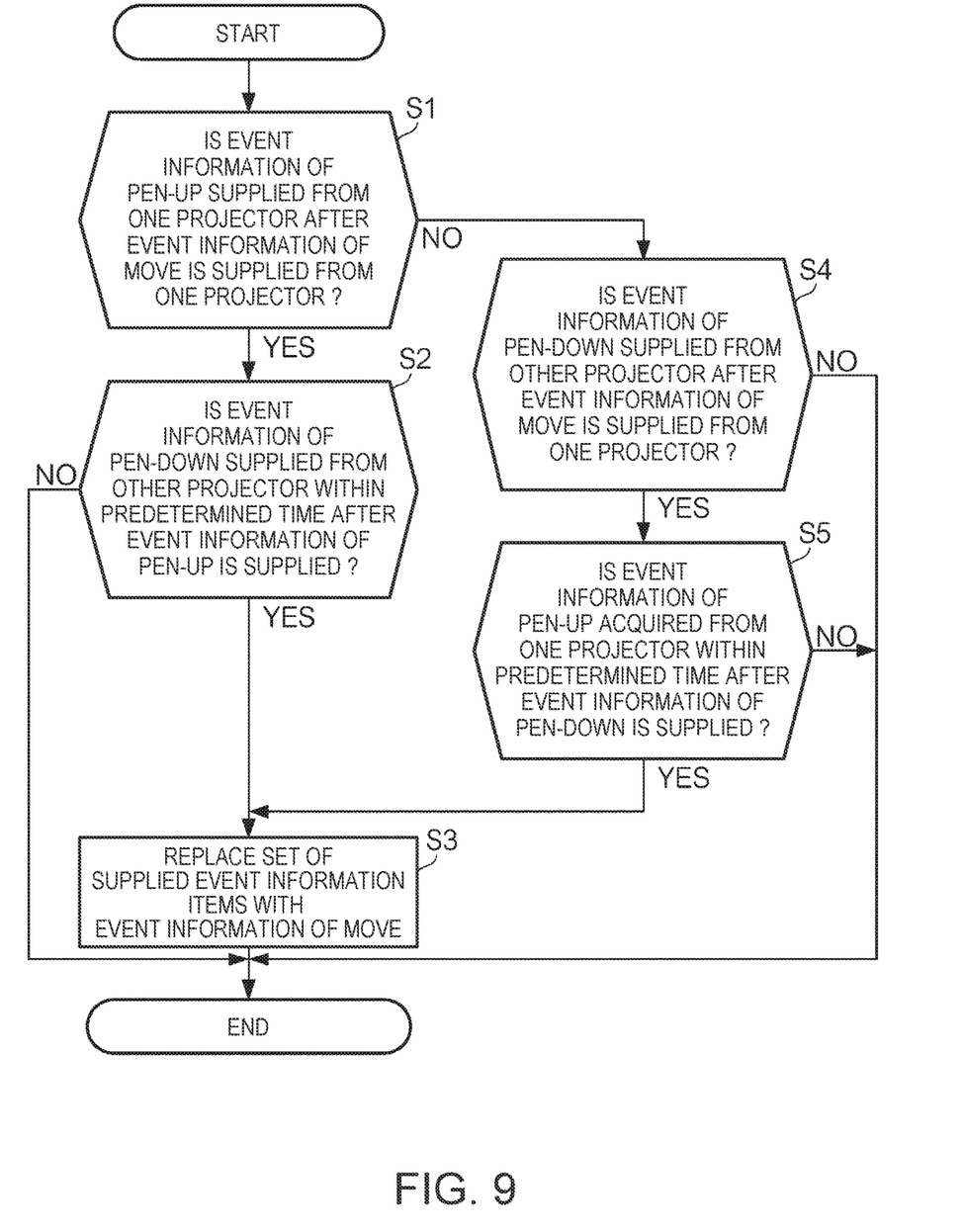
FIG. 9 is a flowchart illustrating a flow of processing which is performed by the information processing device.

FIG. 9 is a flowchart illustrating the flow of the processing of replacing the event information. The information processing device 30 determines whether or not the event information of "move" is supplied from one projector, and then, the event information of "pen-up" is supplied from the one projector (a step S1). In a case where the event information of "move" is supplied from the one projector, and the event information of "pen-up" is supplied from the one projector (YES in the step S1), the information processing device 30 determines whether or not the event information of "pen-down" is supplied from the other projector within a predetermined time after the event information of "pen-up" is supplied (a step S2). In a case where the event information of "pen-down" is supplied from the other projector within a predetermined time (YES in the step S2), the information processing device 30 replaces a set of the event information of "pen-up" which is supplied from the one projector and the event information of "pen-down" which is supplied from the other projector with the event information of "move" (a step S3). In contrast, in a case where it is determined as NO in the step S2, the information processing device 30 ends the processing of FIG. 9.

For example, in a case where the event information of "pen-up" is supplied from the projector 10A after the event information of "move", and the event information of "pen-down" is supplied from the projector 10B within a predetermined time after the event information of "pen-up" is supplied, the information processing device 30 replaces a set of the event information of "pen-up" which is supplied from the projector 10A and the event information of "pen-down" which is supplied from the projector 10B with the event information of "move".

In addition, in a case where it is determined as NO in the step S1, the information processing device 30 determines whether or not the event information of "move" is supplied from the one projector, and then, the event information of "pen-down" is supplied from the other projector (a step S4). In a case where the event information of "move" is supplied from the one projector, and then, the event information of "pen-down" is supplied from the other projector (YES in the step S4), the information processing device 30 determines whether or not the event information of "pen-up" is acquired from the one projector within a predetermined time after the event information of "pen-down" is supplied (a step S5). In a case where the event information of "pen-up" is acquired from the one projector within a predetermined time (YES in the step S5), the information processing device 30 replace a set of the event information of "pen-down" which is supplied from the other projector and the event information of "pen-up" which is acquired from the one projector with the event information of "move" (the step S3). In contrast, in a case where it is determined as NO in the step S5, the information processing device 30 ends the processing of FIG. 9.

For example, in a case where the event information of "move" is supplied from the projector 10A, and then, the event information of "pen-down" is supplied from the projector 10B, and the event information of "pen-up" is supplied from the projector 10A within a predetermined time after the event information of "pen-down" is supplied, the information processing device 30 replaces the set of the event information of "pen-down" which is supplied from the projector 10B and the event information of "pen-up" which is supplied from the projector 10A with the event information of "move".

In a case where the set of the event information items is replaced with the event information of "move", the information processing device 30 moves the icon in a state of being dragged according to the coordinates which are represented by the coordinate information supplied along with the event information of "pen-down". Accordingly, a display position of the dragged icon becomes the position of the position P12 in the region A2.

Furthermore, even in a case where the indicator 20 is moved from the region A2 to the region A1, the information processing device 30 replaces the set of the event information of "pen-up" and the event information of "pen-down" with the event information of "move", as with a case where the indicator 20 is moved from the region A1 to the region A2.

As described above, according to this embodiment, the set of the event information of "pen-up" and the event information of "pen-down" is replaced with the event information of "move", and thus, even in a case where the indicator 20 is moved from a region of one image of two adjacent images to a region of the other image, it is possible to smoothly move the icon in the vicinity of the boundary between the images. Furthermore, in the operational example described above, a case of using the indicator 20 has been described as the operational example, but even in a case where the finger is used, this embodiment is operated as is at the time of using the indicator 20.

Modification Example

As described above, the embodiments of the invention have been described, but the invention is not limited to the embodiments described above, and can be implemented by other various embodiments. For example, the invention may be implemented by modifying the embodiments described above as follows. Furthermore, the invention may be implemented by suitably combining one or a plurality of embodiments described above and modification examples described below.

In the embodiment described above, the set of the event information items which are supplied from the projectors 10A and 10B is replaced with one event information item of "move", but the configuration of replacing the set of the event information items with one event information item is not limited to the configuration of the embodiment. For example, the information processing device 30 and the projector 10B are not connected to each other by the USB cable, but the projector 10A and the projector 10B are connected to each other by the USB cable. The projector 10B supplies the event information of the indicator 20, the coordinate information of the indicator 20, and positional relationship information representing a positional relationship of an image which is projected to the projector 10A.

The projector 10A supplies the information which is supplied from the projector 10B, or positional relationship information representing a positional relationship of the image which is projected from the projector 10A, the event information which is generated by the projector 10A, and the coordinate information which is generated by the projector 10B to the information processing device 30.

For example, in a case where the user brings the indicator 20 into contact with the region A1, the projector 10A transmits the generated event information of "pen-down" and the coordinate information of the indicator 20 to the information processing device 30, and transmits information representing the left side to the information processing device 30 as the information representing the positional relationship of the image which is projected.

In addition, in a case where the user brings the indicator 20 into contact with the region A2, the projector 10B transmits the generated event information of "pen-down" and the coordinate information of the indicator 20 to the projector 10A, and supplies information representing the right side to the projector 10A as the positional relationship information representing the positional relationship of the image which is projected from the projector 10B. The projector 10A transmits the event information, the coordinate information, and the positional relationship information which are supplied from the projector 10B to the information processing device 30.

The information processing device 30 performs processing according to the event information, the coordinate information, and the positional relationship information which are supplied from the projector 10A. For example, in a case where the positional relationship information is the left side, the event information is "pen-down", and the position on the desktop corresponding to the coordinates which are represented by the coordinate information is the position on the icon, the information processing device 30 sets the icon in a drag state. In addition, in a case where the positional relationship information is the right side, the event information is "pen-down", and the position corresponding to the coordinates which are represented by the coordinate information in the desktop is the position on the icon, the information processing device 30 sets the icon in the drag state.

Furthermore, in a case where the event information of one projector is changed to "pen-up" from "move", and the event information of the other projector becomes "pen-down", the projector 10A performs processing of replacing the event information.

For example, in a case where the event information of "move" is generated, and then, the event information of "pen-up" is generated, and the event information of "pen-down" is supplied from the projector 10B within a predetermined time after the event information of "pen-up" is generated, the projector 10A replaces the set of the event information of "pen-up" which is generated by the projector 10A and the event information of "pen-down" which is supplied from the projector 10B with the event information of "move". Then, the projector 10A transmits the event information of "move", and the coordinate information and the positional relationship information which are supplied from the projector 10B to the information processing device 30.

In addition, in a case where the event information of "move" is generated, and then, the event information of "pen-down" is supplied from the projector 10B, and the event information of "pen-up" is generated within a predetermined time after the event information of "pen-down" is supplied, the projector 10A replaces the set of the event information of "pen-up" which is generated by the projector 10A and the event information of "pen-down" which is supplied from the projector 10B with the event information of "move". Then, the projector 10A transmits the event information of "move", and the coordinate information and the positional relationship information which are supplied from the projector 10B to the information processing device 30.

In addition, in a case where the event information of "pen-up" is supplied from the projector 10B within a predetermined time after the event information of "pen-down" is generated, the projector 10A replaces the set of the event information of "pen-down" which is generated by the projector 10A and the event information of "pen-up" which is supplied from the projector 10B with the event information of "move". Then, the projector 10A transmits the event information of "move", and the coordinate information and the positional relationship information which are generated by the projector 10A to the information processing device 30.

In addition, in a case where the event information of "pen-down" is generated within a predetermined time after the event information of "pen-up" is supplied from the projector 10B, the projector 10A replaces the set of the event information of "pen-up" which is supplied from the projector 10B and the event information of "pen-down" which is generated by the projector 10A with the event information of "move". Then, the projector 10A transmits the event information of "move", the coordinate information and the positional relationship information which are generated by the projector 10A to the information processing device 30.

Furthermore, replacing the set of the event information items with one event information item may be performed by the projector 10B but not by the projector 10A. According to this modification example, the event information is replaced in the projector, and thus, it is possible to reduce the processing which is performed by the information processing device.

In addition, in this modification example, the projectors 10A and 10B may have a function of performing drawing by an on-screen image according to the movement of the indicator 20. In such a configuration, the projectors 10A and 10B may perform the drawing processing according to the event information. In a case where the user moves the indicator 20 from the region A1 to the region A2, the projector 10A replaces the set of the event information of "pen-up" which is generated by the projector 10A and the event information of "pen-down" which is generated by the projector 10B with the event information of "move", and supplies the event information of "move" to the projector 10B. The projector 10B performs the drawing processing according to the event information of "move" which is supplied from the projector 10A and the coordinate information in which the event information of "pen-down" is generated. Even in this modification example, the event information is replaced in the projector, and thus, it is possible to reduce the processing which is performed by the information processing device.

In the embodiment of the invention, when the set of the event information items is replaced with one event information item, it may be determined whether or not the event information is replaced according to the coordinate information. For example, in a case where a distance from the position on the desktop corresponding to the coordinate information supplied along with the event information of "move" which is supplied previously to the event information of "pen-up" to the position on the desktop corresponding to the coordinate information supplied along with the event information of "pen-down" is less than a predetermined threshold value, the information processing device 30 may perform the processing of step S3 after it is determined as YES in step S2 or it is determined as YES in step S5.

In addition, in a case where it is determined whether or not the event information is replaced according to the coordinate information, the invention may have the following configuration. For example, in a case where the coordinate information supplied along with the event information of "move" which is supplied previously to the event information of "pen-up" is within a predetermined range from the boundary between the region A1 and the region A2, and the coordinate information supplied along with the event information of "pen-down" is within a predetermined range from the boundary between the region A1 and the region A2, the information processing device 30 may perform the processing of the step S3 after it is determined as YES in the step S2 or it is determined as YES in the step S5.

In the embodiments described above, the information processing device 30 performs the drag processing according to the event information and the coordinate information which are supplied from the projectors 10A and 10B, but the processing performed according to the event information and the coordinate information which are supplied from the projectors 10A and 10B is not limited to the drag processing. For example, the information processing device 30 may perform drawing processing according to the event information and the coordinate information. For example, according to this modification example, in a case where the information processing device 30 executes drawing software, drawing can be performed according to the movement of the indicator 20. In addition, in a case where the information processing device 30 spreads the screen of the drawing software onto the entire desktop, and the indicator 20 is moved from the region A1 to the region A2 or from the region A2 to the region A1 in a state where the indicator 20 is brought into contact with the projection surface, it is possible to draw a line without any break on the boundary between the region A1 and the region A2.

In the embodiments described above, the number of projectors which are used by the information processing device 30 in the multi display function is not limited to two, and three or more projectors may be used. Even in a case where the number of projectors which are used in the multi display function is greater than or equal to 3, the information processing device 30 replaces the set of two event information items with one event information item, as with the embodiments described above.

What is claimed is:

1. A projector comprising:
a projection unit that projects an image to a projection surface;
an interface that acquires a pen down event from other projector connected to the projector; and
a central processing unit (CPU) programmed to execute:
generating a move event and a pen up event that occurred by an operation of an indicator with respect to the image;
replacing event information of the pen up event to event information of the move event when the pen down event is acquired by the interface in the time between generating the pen up event and the move event; and
processing the operation corresponding to the event information of the move event.

2. The projector according to claim 1,
wherein the CPU is further programmed to execute replacing event information of the pen down event to event information of the move event when the pen down event acquired by the interface in the time between generating the pen up event and the move event, and
the interface sends the event information of the move event to the other projector.

3. The projector according to claim 1,
wherein the CPU is further programmed to execute processing of performing drawing within the image which is projected from the projector or the image which is projected from the other projector.

4. The projector according to claim 1,
wherein the pen down event is an event representing that the indicator is in contact with the projection surface.

5. The projector according to claim 1,
wherein the pen up event is an event representing that the indicator is separated from the projection surface.

6. The projector according to claim 1,
wherein the move event is an event representing that the indicator is moved on the projection surface.

7. The projector according to claim 1,
wherein the CPU is further programmed to execute determining whether or not the event information of the pen up event is generated within a predetermined time after the event information of the pen down is acquired.

8. A projector comprising:
a projection unit that projects an image to a projection surface;
an interface that acquires a pen down event from other projector connected to the projector; and
a central processing unit (CPU) programmed to execute:
  generating a move event and a pen up event that occurred by an operation of an indicator with respect to the image;
  replacing event information of the pen up event to event information of the move event when generating the pen up event in the time between generating the move event and acquiring the pen down event; and
  processing the operation corresponding to the event information of the move event.

9. The projector according to claim 8,
wherein the CPU is further programmed to execute replacing event information of the pen down event to event information of the move event when generating the pen up event in the time between generating the move event and acquiring the pen down event, and the interface sends the event information of the move event to the other projector.

10. The projector according to claim 8,
wherein the CPU is further programmed to execute processing of performing drawing within the image which is projected from the projector or the image which is projected from the other projector.

11. The projector according to claim 8,
wherein the pen down event is an event representing that the indicator is in contact with the projection surface.

12. The projector according to claim 8,
wherein the pen up event is an event representing that the indicator is separated from the projection surface.

13. The projector according to claim 8,
wherein the move event is an event representing that the indicator is moved on the projection surface.

14. The projector according to claim 8,
wherein the CPU is further programmed to execute determining whether or not the event information of the pen down is acquired within a predetermined time after generating the event information of the pen up event.

15. A projector control method comprising:
generating a move event that occurred by an operation of an indicator with respect to an image projected onto a projection surface from the projector;
acquiring a pen down event from other projector connected to the projector;
generating a pen up event that occurred by the operation of the indicator;
replacing event information of the pen up event to event information of the move event when the pen down event is acquired in the time between generating the pen up event and the move event; and
processing the operation corresponding to the event information of the move event.

* * * * *